United States Patent Office 2,743,239
Patented Apr. 24, 1956

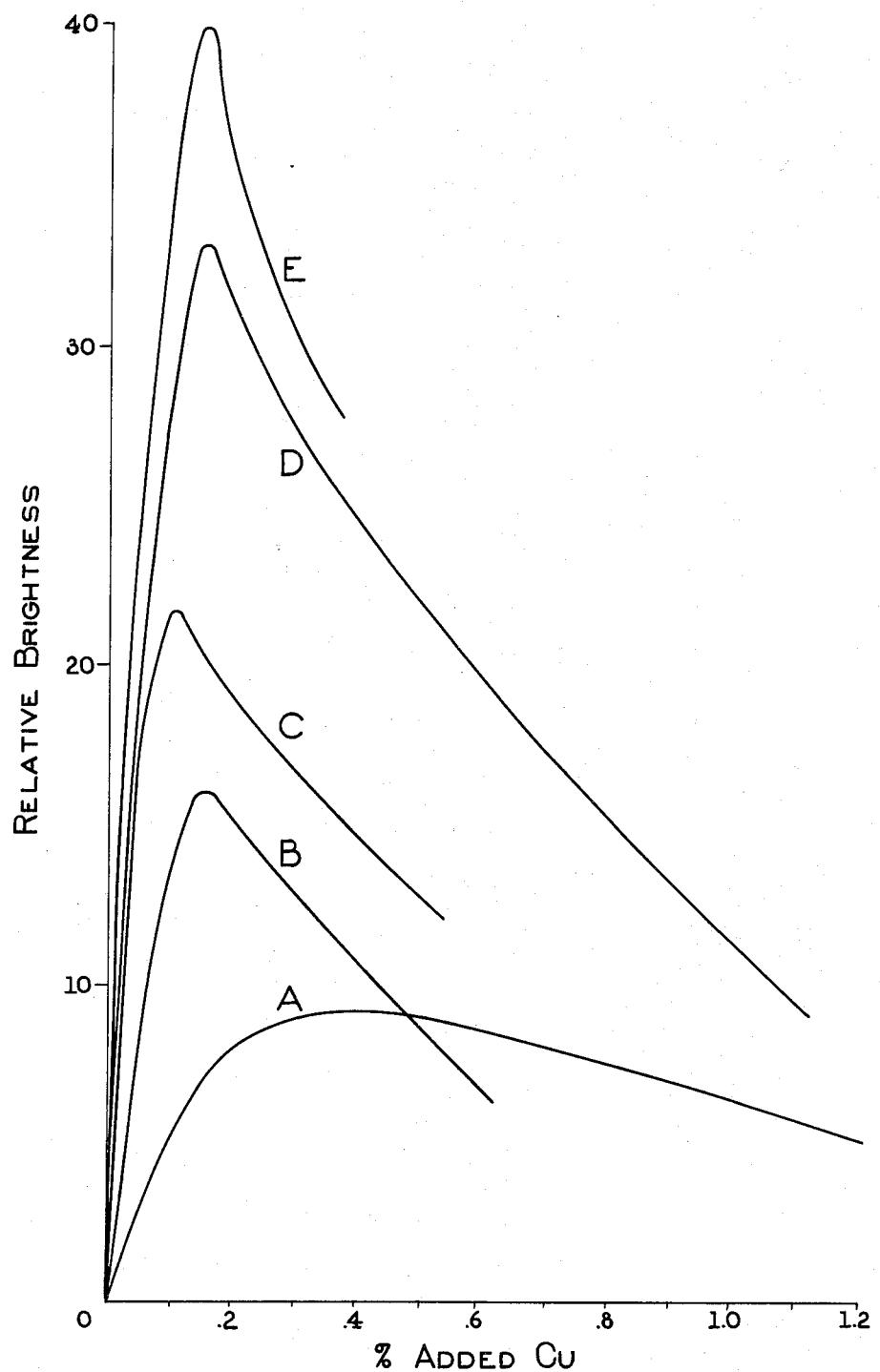

2,743,239

ELECTROLUMINESCENT ZINC SULFIDE PHOSPHOR AND METHOD OF PREPARATION

Herman C. Froelich, Cleveland Heights, Ohio, assignor to General Electric Company, a corporation of New York Application December 31, 1952, Serial No. 328,938

4 Claims. (Cl. 252—301.6)

My invention relates generally to phosphors or fluorescent materials, and more particularly to zinc sulphide type phosphors. It is an object of my invention to provide a zinc sulphide type phosphor which is efficiently responsive to excitation by an electrical field (electroluminescent). A further object is to provide such a phosphor having a bright orange emission.

I have discovered that phosphors with bright orange electroluminescent response may be made reproducibly if zinc sulphide is fired with both manganese and copper as activators, provided that the copper content is sufficiently high and the firing is carried out in pure hydrogen sulphide.

While it has been proposed heretofore to provide zinc sulphide phosphors activated with manganese and copper, such phosphors contained a small copper content characteristic of prior art sulphide type phosphors, usually .0001 to .005% of copper, so that they were effectively energizable by ultraviolet radiation provided the copper content was not raised materially above the stated range. However, such prior art phosphors are not effectively excitable by an electrical field.

In accordance with the present invention, efficient electroluminescent response is obtained by firing in pure $H_2S$ and by employing amounts of activating manganese and copper in the ranges, by weight of the ZnS, of .4 to 1.4% Mn and about .05 to 1% Cu. The materials may be fired at a temperature of about 900–1200° C. for about a half hour and, subsequently, are preferably washed with sodium cyanide solution to remove excess copper sulphide.

In general, the hardness and coarseness of the phosphors increases with increasing copper content much more than it does with increasing manganese content. After washing with NaCN the depth of gray body color of the phosphors increases somewhat with increasing copper content, indicating progressively greater solubility of copper sulphide.

The electroluminescent emission is substantially of the same orange color (peaking at about 5850 A.) over the range of compositions indicated above. The emitted color also remains orange over a wide range of frequencies of excitation, such as 60 to 15,000 cycles per second. Brightness measurements indicate that a sharply peaked optimum brightness is obtained with materials containing .7% Mn and .15% added Cu, when excited by 60 cycle current. For excitation with higher frequency currents, such as 5000 cycles, the optimum copper concentration for compositions with about .7% manganese is somewhat higher, namely about .21% added copper.

While phosphors prepared by firing at temperatures in the range of 900–1200° C. all gave a good electroluminescent response, those fired at 1100° were the brightest under both 60 and 5000 cycle excitation.

That copper is unique as a secondary activator is indicated by the fact that no significant improvement over manganese activator alone is obtained by the addition of such metals as Ag, Cd, Ca, Al, Sc, Ga, In, La, Ce, Pr, Nd, Sn, Pb, Bi, P, As and Sb. In the absence of Cu as secondary activator, the $H_2S$-fired ZnS phosphor activated with Mn alone does not respond to electroluminescent excitation.

Analysis of the phosphors for their retained copper content shows that it is an almost linear function of the amount of added copper over the range of 0–1% added Cu. Thus, the retained copper content is usually about 25% of the amount of added Cu for phosphors fired at 1100° C. Manganese is not removed by the NaCN wash. The retained copper content decreases at lower firing temperature and it increases with higher firing temperature. However, it is independent of the manganese concentration over the range of about .1 to 2% Mn. It is therefore not possible to correlate the electroluminescent response of the phosphors with the analytically determined copper concentrations alone. It is the combination of a definite copper content with a definite manganese content which produces phosphors of highest brightness.

An analysis of a number of samples of slightly varying composition, all of which were especially bright under both 60 and 5000 cycles excitation, showed that these materials averaged .7% Mn and .15% added Cu, or .039% retained Cu. This corresponds to a mole ratio of about 21:1 for Mn to retained Cu.

As an example of the preparation of a suitable phosphor, 10 grams of pure zinc sulphide are wetted down with an aqueous solution containing .07 gram Mn and .015 gram Cu, both as nitrates, although other suitable salts may be used such as sulfates or chlorides. After drying and sieving, the powder is fired in $H_2S$ at 1100° C. for one-half hour. It is cooled in $H_2S$, screened, washed with a lukewarm (50° C.) solution (say 5%) of NaCN and water, dried, and screened again through a 200 mesh sieve. When dispersed in a dielectric, such as castor oil, the material gives a very bright orange electroluminescent emission under both 60 and 5000 cycle current excitation.

The accompanying drawing contains several curves showing the averaged brightness with 60 cycle excitation as a function of the added copper content, for a number of phosphors falling into five different ranges of manganese concentrations. The manganese concentrations were as follows: curve A, 1.4–1.6% Mn; curve B, .08% Mn; curve C, .32–.4% Mn; curve D, .8–1% Mn; and curve E, .7% Mn. The curves show an enormous increase of electroluminescent brightness of the phosphors containing copper as secondary activator, compared with phosphors containing manganese alone. The curves also indicate the virtually insignificant electroluminescence of phosphors containing the low copper concentrations (up to about .005%) heretofore employed in zinc sulphide type phosphors. The curves further show a very sensitive relationship between brightness and sensitized concentration for compositions near the optimum. The highest brightness is associated with sharply peaked maxima.

What I claim as new and desire to secure by Letters Patent of the United States is:

1. The method of preparing an electroluminescent responsive phosphor emitting orange light which comprises firing in an atmosphere of pure hydrogen sulphide and at a temperature in the range of about 900–1200° C. a mixture of zinc sulphide with activating manganese and copper in proportions, by weight of the zinc sulphide, in the range of .4% to 1.4% manganese and .05% to 1% copper.

2. The method of preparing an electroluminescent responsive phosphor emitting orange light which comprises firing in an atmosphere of pure hydrogen sulphide and at a temperature in the range of about 900–1200° C. a mixture of zinc sulphide with activating manganese and copper in proportions, by weight of the zinc sulphide, of about .7% manganese and .15% copper.

3. An electroluminescent phosphor of zinc sulphide activated with manganese and copper and prepared as set forth in claim 1.

4. An electroluminescent phosphor of zinc sulphide activated with manganese and copper and prepared as set forth in claim 2.

References Cited in the file of this patent

UNITED STATES PATENTS

| | | |
|---|---|---|
| 2,218,750 | Hinderer | Oct. 22, 1940 |
| 2,447,322 | Fonda | Aug. 17, 1948 |
| 2,470,451 | Wood | May 17, 1949 |
| 2,504,674 | Fonda | Apr. 18, 1950 |
| 2,660,566 | Froelich | Nov. 24, 1953 |

OTHER REFERENCES

Chem. Abstracts, vol. 40, 1946, pp. 4297–4298. (Copy in Scientific Library.)